United States Patent
Roush (10) Patent No.: US 12,085,738 B2
(45) Date of Patent: Sep. 10, 2024

(54) WATCH WITH DECORATIVE DISPLAY LAYER

(71) Applicant: Garmin Switzerland GmbH, Schaffhausen (CH)

(72) Inventor: Adam W. Roush, Lenexa, KS (US)

(73) Assignee: Garmin Switzerland GmbH (CH)

( * ) Notice: Subject to any disclaimer, the term of this patent is extended or adjusted under 35 U.S.C. 154(b) by 826 days.

(21) Appl. No.: 17/225,821

(22) Filed: Apr. 8, 2021

(65) Prior Publication Data

US 2022/0221825 A1     Jul. 14, 2022

Related U.S. Application Data (60) Provisional application No. 63/135,415, filed on Jan. 8, 2021.

(51) Int. Cl.
| | |
|---|---|
| *G02B 5/12* | (2006.01) |
| *G02B 5/124* | (2006.01) |
| *G04G 9/00* | (2006.01) |
| *G04G 17/02* | (2006.01) |
| *G08B 5/00* | (2006.01) |

(52) U.S. Cl.
CPC ........... *G02B 5/124* (2013.01); *G04G 9/0035* (2013.01); *G04G 17/02* (2013.01); *G08B 5/004* (2013.01)

(58) Field of Classification Search
USPC ....................................................... 359/517
See application file for complete search history.

(56) References Cited

U.S. PATENT DOCUMENTS

| | | | | |
|---|---|---|---|---|
| 4,332,020 A | * | 5/1982 | Leopold ............... | G04B 19/223 |
| | | | | 968/161 |
| 5,696,627 A | * | 12/1997 | Benson ................. | G02B 5/124 |
| | | | | 359/530 |
| 5,866,236 A | * | 2/1999 | Faykish ................ | G02B 5/128 |
| | | | | 428/209 |

(Continued)

OTHER PUBLICATIONS

Printout from https://buy.garmin.com/en-US/US/p/583562/pn/010-01850-AC, published prior to Apr. 8, 2021.

(Continued)

*Primary Examiner* — Jennifer D. Carruth
(74) *Attorney, Agent, or Firm* — Samuel M. Korte; Max M. Ali (57) ABSTRACT

An electronic device that includes a display assembly comprising a display, a texture layer, a transmissive and reflective layer, and a cover layer. The display includes an upper surface on which visual data is displayed and from which light is emitted. The texture layer includes a lower surface having a first texture with structural components and a second texture with structural components that are different from structural components of the first texture. The transmissive and reflective layer is positioned between the display and the texture layer and includes a first texture with structural components that are complementary to the structural components of the first texture of the texture layer and a second texture with structural components that are complementary to the structural components of the second texture of the texture layer. The cover layer is positioned above the texture layer and forms an upper surface of the display assembly.

20 Claims, 6 Drawing Sheets

(56) References Cited

U.S. PATENT DOCUMENTS

| | | | | |
|---|---|---|---|---|
| 6,010,223 A | * | 1/2000 | Gubela, Sr. ............ | G02B 5/124 |
| | | | | 359/530 |
| 2001/0036533 A1 | * | 11/2001 | Smith .................... | G02B 5/124 |
| | | | | 428/338 |
| 2002/0109808 A1 | * | 8/2002 | Sekiguchi ........... | G02F 1/13471 |
| | | | | 349/96 |

OTHER PUBLICATIONS

Printout from https://buy.garmin.com/en-US/US/p/698394/pn/010-02239-00, published prior to Apr. 8, 2021.
Printout from https://www.3m.com/3M/en_US/company-us/all-3m-products/~/3M-Screenprinting-UV-lnk-9800-Series/?N=5002385+3288722012&rt=rud, published prior to Apr. 8, 2021.
Printout from https://www.arwi.no/products-and-services/decorative-coatings/, published prior to Apr. 8, 2021.
Printout from https://www.fossil.com/en-us/products/hybrid-smartwatch-hr-collider-dark-brown-leather/FTW7008.html?, published prior to Apr. 8, 2021.

* cited by examiner

WATCH WITH DECORATIVE DISPLAY LAYER

RELATED APPLICATIONS

The present patent application claims priority benefit under 35 U.S.C. § 119(e) of U.S. Provisional Patent Application Ser. No. 63/135,415, filed Jan. 8, 2021, and titled "Watch with Decorative Display Layer," which is hereby incorporated by reference in its entirety.

BACKGROUND

Smart watches, fitness watches, and other wrist-worn electronic devices typically include a display which displays the time of day, the date, and information such as a number of steps taken by the wearer, a heart rate of the wearer, calories burned by the wearer, text messages, emails, phone call notices, and the like. In order to see the display clearly and avoid obstruction of any information shown on the display, the electronic device includes only transparent layers or films above or on top of the display.

SUMMARY

Embodiments of the present technology provide a wrist-worn electronic device that includes a display assembly comprising a layer which is bonded to an upper surface of the display and presents a decorative pattern or image. The layer is at least partially reflective to present the decorative pattern, but is also transmissive so as avoid obstruction of any information shown on the display and permit the display to be seen clearly. In addition to the display and the transmissive and reflective layer, the display assembly broadly comprises a texture layer and a cover layer. The texture layer is also positioned above the display and is configured to be transparent to light received from sources above and below the texture layer. The texture layer includes a lower surface having a first texture with structural components and a second texture with structural components that are different from structural components of the first texture. The transmissive and reflective layer includes an upper surface in contact with the lower surface of the texture layer and a lower surface on which a first texture and a second texture are each positioned. The first texture of the transmissive and reflective layer includes structural components that are complementary to the structural components of the first texture of the texture layer. The second texture of the transmissive and reflective layer includes structural components that are complementary to the structural components of the second texture of the texture layer. The cover layer is positioned above the texture layer and forms an upper surface of the display assembly. The cover layer is configured to be transparent to light received from sources above and below the cover layer.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

The drawing figures do not limit the present technology to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DESCRIPTION

The following description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Relational terms, such as "above", "below", "over", "beneath", "upper", "upward", "lower", "downward", "top", "bottom", "outer", "inner", etc., may be used throughout this description. These terms are used with reference to embodiments of the technology and the orientations and relative positionings of the components thereof shown in the accompanying figures. Embodiments of the technology may be oriented in ways other than those shown in the figures. Therefore, the terms do not limit the scope of the present technology.

Embodiments of the present technology relate to a wrist-worn electronic device that includes a display assembly. The wrist-worn electronic device may be embodied by an electronic watch, a fitness watch, a sports watch, a step counter, a smart watch, or any other wrist worn electronic device that includes a display, as part of the display assembly, which displays information, visual data, and/or the time of day. Typically, wrist-worn electronic devices that do not include the display assembly of the present technology include only transparent layers or films over the display so as not to obscure the display. However, this setup precludes the inclusion of decorative aspects on the face of the device that would enhance the appearance of the device and make the device look more fashionable and less technical. The display assembly includes a transmissive and reflective layer that is bonded to an upper surface of the display and formed from material that is both reflective to at least a portion of the light that is received from external sources and transmissive to light generated by the display. The transmissive and reflective layer includes a first texture and a contrasting second texture that, in combination, present a decorative pattern or image that is seen on the face of the device.

Embodiments of the technology will now be described with reference to the drawing figures. Referring initially to FIGS. 1-4B, a display assembly 10 for use with a wrist-worn electronic device 12 is illustrated. The electronic device 12 may include a housing with a generally circular, oval, or multi-sided shape and a user interface including pushbuttons or other components along a housing side wall. The electronic device 12 may further include a strap not shown in the figures.

Figure 4A:
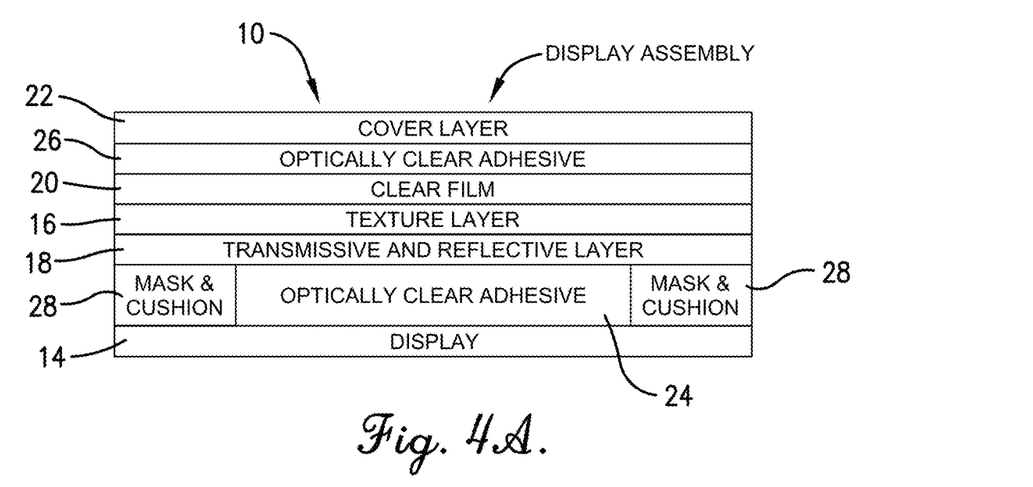
FIG. 4A is a schematic diagram of a plurality of layers that form a first embodiment of the display assembly.
Figure 4B:
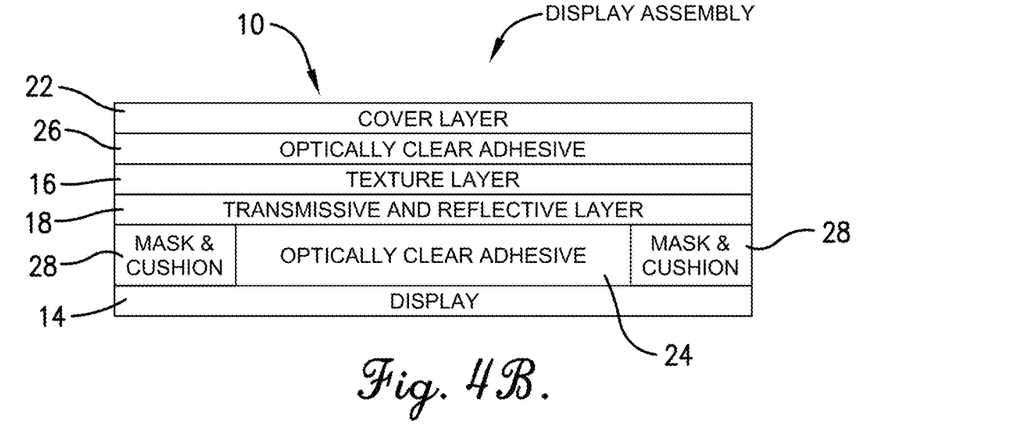
FIG. 4B is a schematic diagram of a plurality of layers that form a second embodiment of the display assembly.

The display assembly 10, as shown in FIGS. 4A and 4B, is formed by a stack of layers and broadly comprises a display 14, a texture layer 16, a transmissive and reflective layer 18, a clear film layer 20, a cover layer 22, a first optically clear adhesive layer 24, and a second optically clear adhesive layer 26. The display assembly 10 may also include mask and cushion components 28.

The display 14 generally includes video devices that emit light: light-emitting diode (LED), organic LED (OLED), passive matrix OLED (PMOLED), active matrix OLED (AMOLED), thin film transistor (TFT) LCD, or the like, or combinations thereof. The display 14 may include an upper surface with a screen on which information is presented and light is emitted. The display 14 may have any one of a variety of shapes such as square, rectangular, or any other multi-sided shape—although typically the shape corresponds to, or varies according to, the shape of the perimeter of the housing. Exemplary embodiments of the display 14 have a generally circular shape. The display 14 may be in electronic communication with memory components and processor components and may receive data or information therefrom that is to be shown on the display 14.

The texture layer 16 is generally transmissive, or wholly or partially transparent, to light received from sources both above and below the texture layer 16. In addition, the texture layer 16 provides texture and/or structure for the transmissive and reflective layer 18. The texture layer 16 may be formed from materials that are transmissive, or wholly or partially transparent, to visible spectrum light. In addition, the texture layer 16 may have antiglare properties. The texture layer 16 includes an upper surface and a spaced apart lower surface.

Figure 5A:
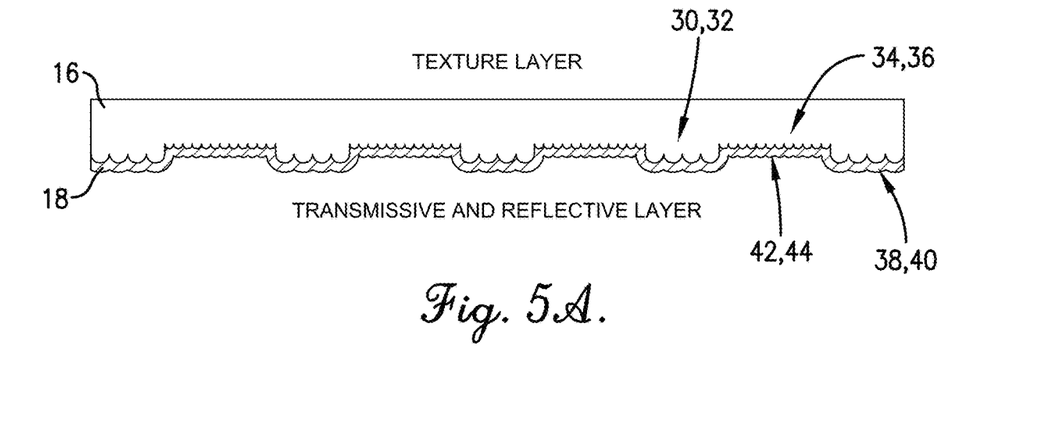
FIG. 5A is a schematic side view of a texture layer and a transmissive and reflective layer from the display assembly.
Figure 5B:
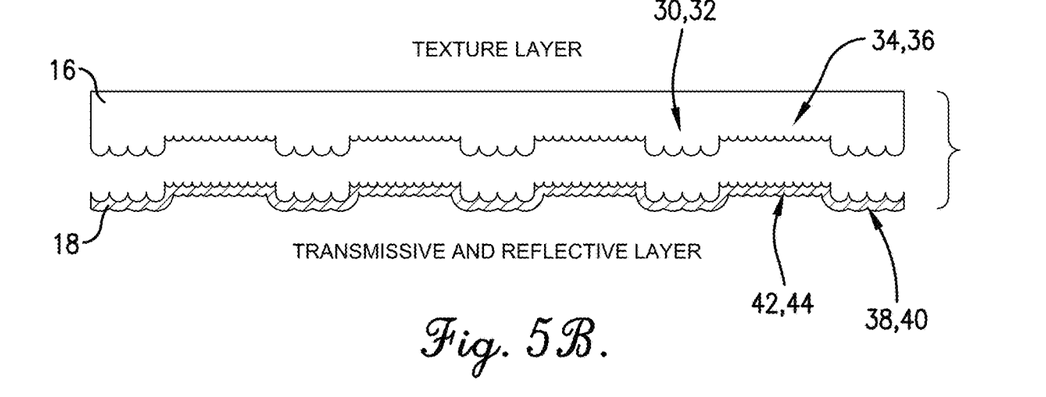
FIG. 5B is a schematic side view of the texture layer and the transmissive and reflective layer spaced apart from one another.

Referring to FIGS. 5A and 5B, the lower surface of the texture layer 16 includes at least a first texture 30 and a second texture 34. Additional textures are also possible. The first texture 30 occupies a first region 32 or a first portion of the area of the lower surface of the texture layer 16. The second texture 34 occupies a second region 36 or a second portion of the area of the lower surface of the texture layer 16. Additional textures may occupy additional regions. One region 32, 36 may have one or more openings, gaps, or spaces which the other region 32, 36 occupies. One region 32, 36 may include or present a first pattern, and the other region 32, 36 may include or present a second pattern which is complementary to, the inverse of, or the negative of, the first pattern. Additionally, or alternatively, one region may include or present an image, and the other region 32, 36 may include or present a negative of the image.

The first texture 30 generally has structural components or features that are different from structural components or features of the second texture 34. In some instances, the first texture 30 may have a roughness or a smoothness that is different from the roughness or smoothness of the second texture 34. Also, the first texture 30 may include structures, substructures, or microstructures that have a first average size, and the second texture 34 may include structures, substructures, or microstructures that have a second average size—different from the first average size. Furthermore, the first texture 30 may include structures, substructures, or microstructures that have a first shape, and the second texture 34 may include structures, substructures, or microstructures that have a second shape—different from the first shape. In some embodiments, the first texture 30 may include structures, substructures, or microstructures that extend outward from the lower surface of the texture layer 16, and the second texture 34 may include impressions or indentations that extend inward into the lower surface of the texture layer 16. In other embodiments, the first texture 30 and the second texture 34 may each include structures, substructures, or microstructures that extend both outward from and inward into the lower surface of the texture layer 16. The features of each of the first texture 30 and the second texture 34 may be uniform or may be non-uniform and may have random shapes and/or sizes. In addition, the features of the first texture 30 may be positioned at a first average distance from the upper surface of the texture layer 16, and the features of the second texture 34 may be positioned at a second average distance from the upper surface of the texture layer 16, wherein the first average distance is different from the second average distance. Thus, the first texture 30 may appear to have a height or depth that is different from the height or depth of the second texture 34.

Referring to FIGS. 5A and 5B, cross-sectional views of the texture layer 16 and the transmissive and reflective layer 18 are shown. In FIG. 5A, the texture layer 16 and the transmissive and reflective layer 18 are in contact with one another, as is normally the case. In FIG. 5B, the texture layer 16 and the transmissive and reflective layer 18 are separated from one another to show detail of the interface between the two layers. The figures illustrate an example of the features of the first texture 30 and the second texture 34. In the example, the first texture 30 has a roughness, an average size of features, and an average distance from the upper surface that are different from the roughness, the average size of features, and the average distance from the upper surface, respectively, of the second texture 34.

The texture layer 16 may be formed from materials, such as polymers, which can be shaped or manipulated to retain a certain structure. The first region 32 with the first texture 30 and the second region 36 with the second texture 34 may be formed using techniques such as tool pressing, scraping, machining, etching, curing, or the like, or combinations thereof.

The transmissive and reflective layer 18 is positioned between the display 14 and the texture layer 16 such that an upper surface of the transmissive and reflective layer 18 is in contact with the lower surface of the texture layer 16. The transmissive and reflective layer 18 generally transmits light received from sources below the transmissive and reflective layer 18 and reflects at least a portion of the light received from sources above the transmissive and reflective layer 18. For example, the transmissive and reflective layer 18 transmits, or is wholly or partially transparent to, the light emitted from the display 14. In addition, the transmissive and reflective layer 18 reflects at least a portion of the light that is received from above the transmissive and reflective layer 18, such as from external sources including ambient light or sunlight.

The transmissive and reflective layer 18 may be formed from materials with both transmissive and reflective properties, such as metallic powders or dust. The transmissive and reflective layer 18 may be applied, deposited, or coated onto the lower surface of the texture layer 16 using vapor deposition techniques or the like. As a result, the structural components of the upper surface of the transmissive and reflective layer 18 are complementary to the structural components of the lower surface of the texture layer 16. Accordingly, as shown in FIGS. 5A and 5B, the upper surface of the transmissive and reflective layer 18 includes at least a first texture 38 and a second texture 42. As with the texture layer 16, additional textures are also possible. The first texture 38 occupies a first region 40 or a first portion of the area of the upper surface of the transmissive and reflective layer 18. The second texture 42 occupies a second region 44 or a second portion of the area of the upper surface of the transmissive and reflective layer 18. Additional textures may occupy additional regions. In shape and size, the structural components or features of the first texture 38 of the transmissive and reflective layer 18 generally are complementary to, the inverse of, or the negative of, the structural components or features of the first texture 30 of the texture layer 16. In shape and size, the structural components or features of second texture 42 of the transmissive and reflective layer 18 generally are complementary to, the inverse of, or the negative of, the structural components or features of the second texture 34 of the texture layer 16. Furthermore, the first region 40 of the transmissive and reflective layer 18 generally is the same size as, occupies the same area as, and is aligned with, the first region 32 of the texture layer 16. The second region 44 of the transmissive and reflective layer 18 generally is the same size as, occupies the same area as, and is aligned with, the second region 36 of the texture layer 16.

Figure 1:
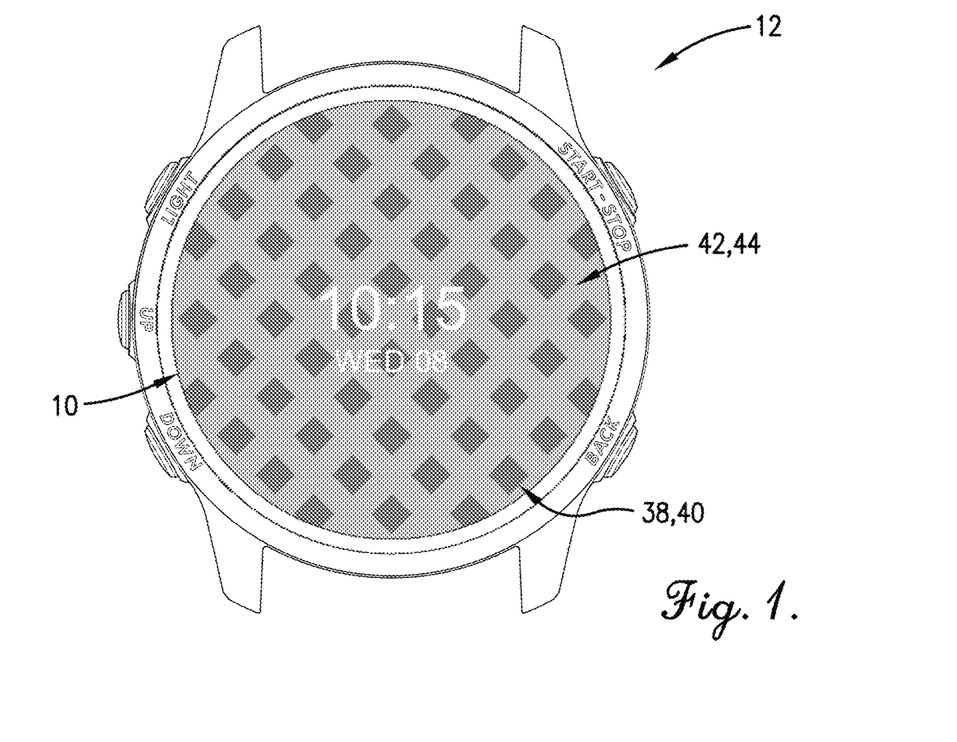
FIG. 1 is a top view of a wrist-worn electronic device including a display assembly constructed in accordance with various embodiments of the current technology, the display assembly including a display.
Figure 2:
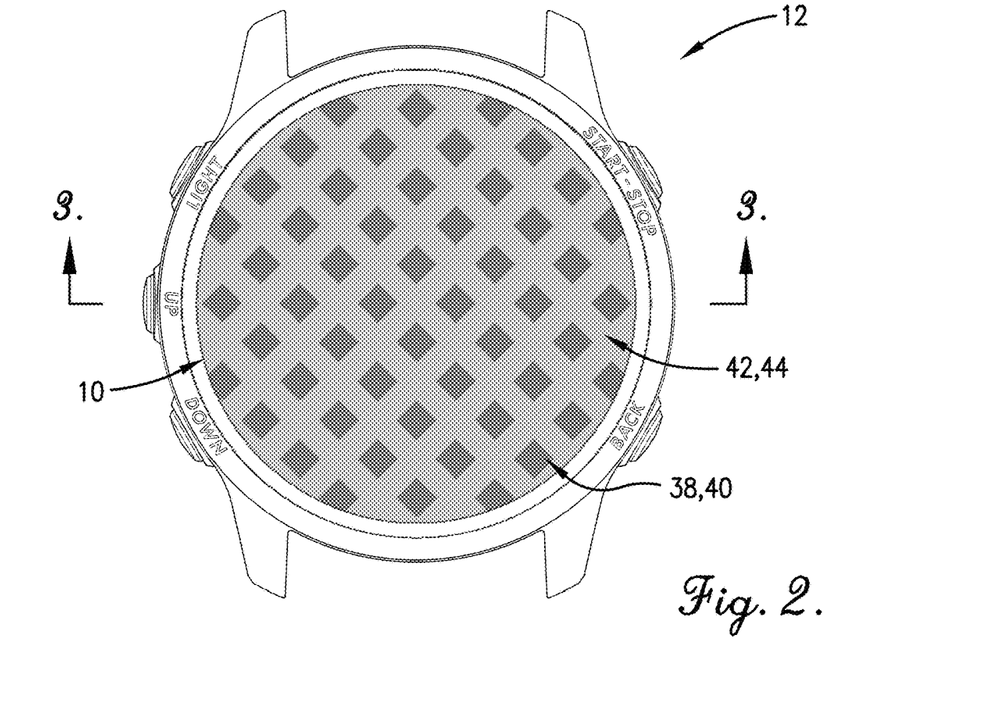
FIG. 2 is a top view of the wrist worn electronic device and the display assembly with the display turned off.
Figure 3:
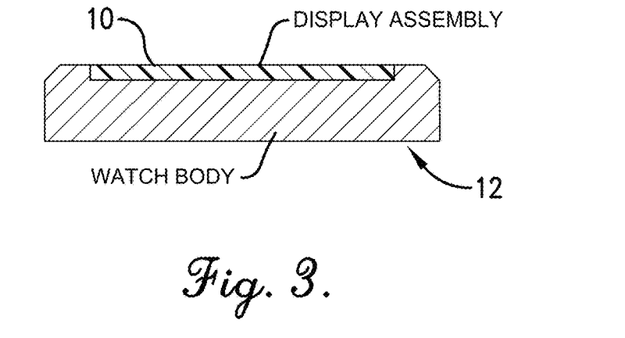
FIG. 3 is a cross-sectional view of the wrist worn electronic device and the display assembly cut along the line 3-3 in FIG. 2.
Figure 6:
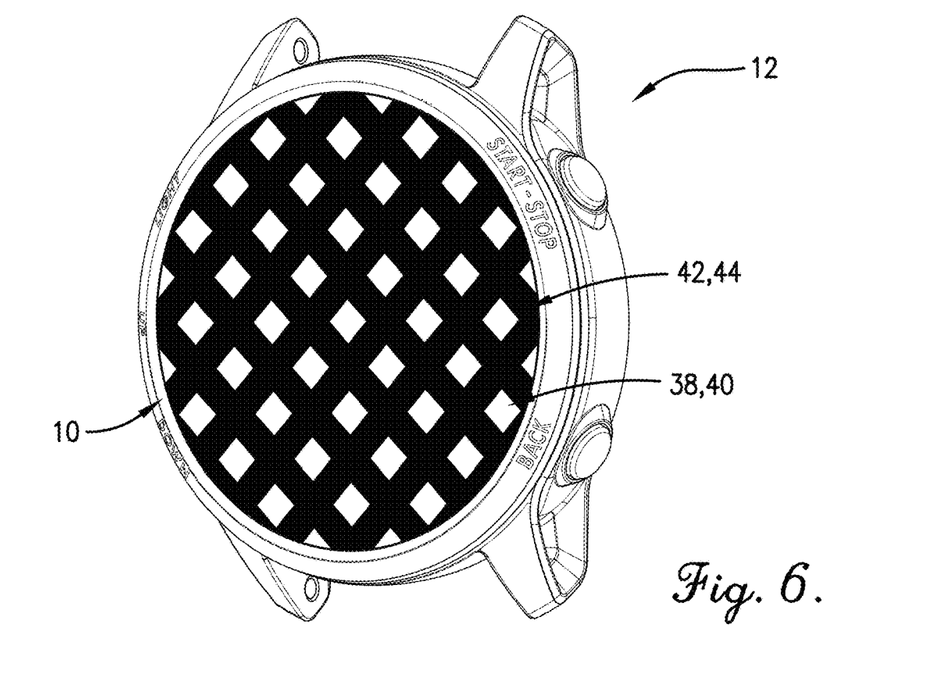
FIG. 6 is a perspective view of the wrist worn electronic device and the display assembly from a first perspective.
Figure 7:
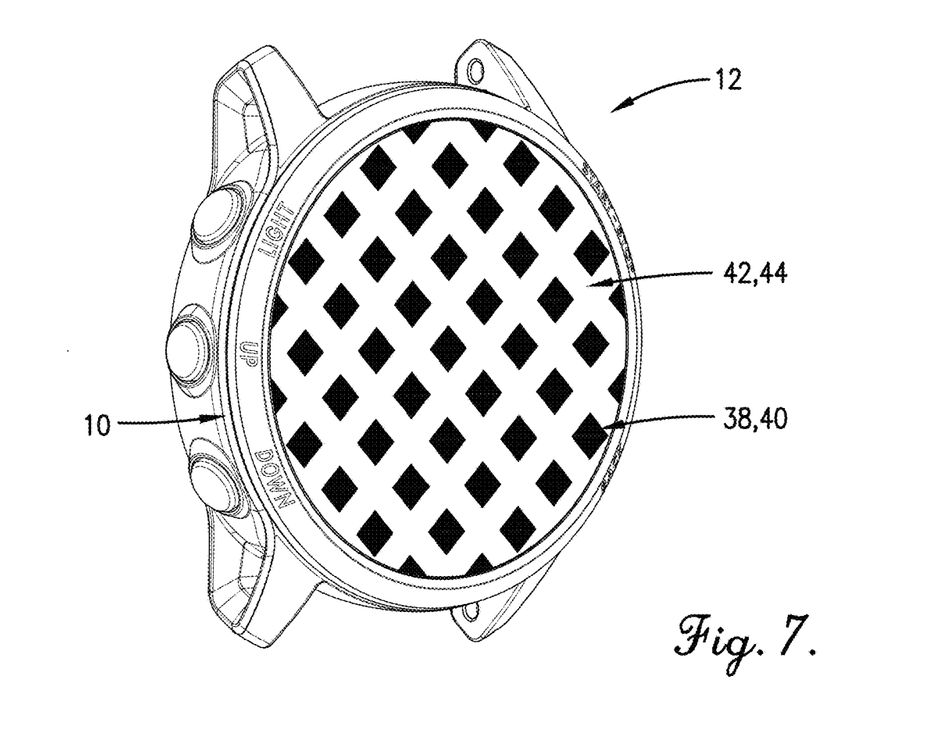
FIG. 7 is a perspective view of the wrist worn electronic device and the display assembly from a second perspective.

Given that the structural components or features of the first texture 38 are different from the structural components or features of the second texture 42, light reflects differently from the first texture 38 than it does from the second texture 42. The difference in reflection between the two textures 38, 42 may result in a visual contrast between the two textures 38, 42. The level of contrast may depend on, or vary according to, the relative angle, or range of relative angles, between the transmissive and reflective layer 18 and the source of the light that is incident on the transmissive and reflective layer 18. For example, at a first relative angle, as shown in FIG. 6, the first texture 38, occupying the first region 40 which has a shape of spaced-apart diamonds, appears lighter than the second texture 42, occupying the second region 44 which has a shape of crossing stripes surrounding the diamonds. At a second relative angle, as shown in FIG. 7, the first texture 38 appears darker than the second texture 42. In both FIGS. 6 and 7, the level of contrast between the first texture 38 and the second texture 42 is high. Furthermore, the properties of the first texture 38 and the second texture 42 just described may be present through various ranges of relative angles. By comparison, the level of contrast between the first texture 38 and the second texture 42 on the transmissive and reflective layer 18 shown in FIGS. 1 and 2 is lower resulting from a third relative angle, or range of relative angles, between the transmissive and reflective layer 18 and the source of the light that is incident on the transmissive and reflective layer 18.

Figure 8:
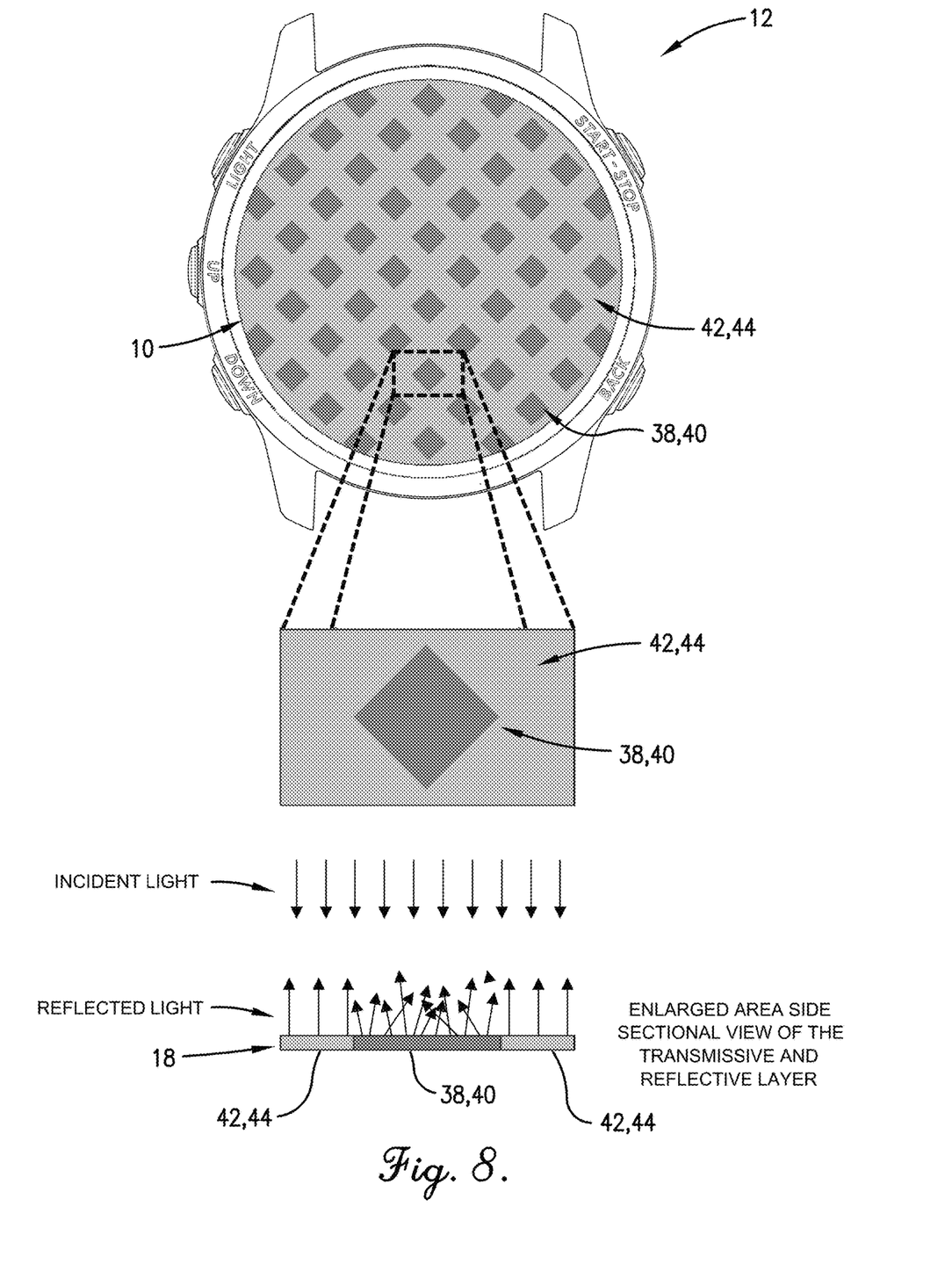
FIG. 8 is a combination top view, enlarged view, and side sectional view of the wrist worn electronic device and the display assembly and the transmissive and reflective layer illustrating the reflection of light from the transmissive and reflective layer.
Figure 9:
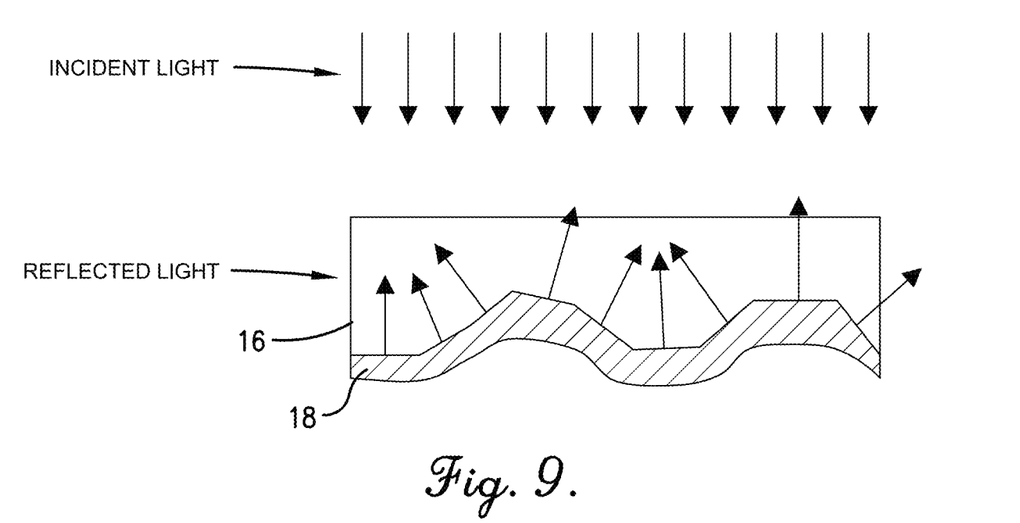
FIG. 9 is an enlarged side sectional view of the transmissive and reflective layer illustrating the reflection of light from the transmissive and reflective layer.

In addition, depending on, or varying according to, the relative angle, light may be more diffuse and reflect more chaotically from one texture and may be less diffuse and reflect more directly from the other texture. For example, at one relative angle or range of relative angles, light may be more diffuse and reflect more chaotically from the first texture 38, resulting in a darker appearance, while light may be less diffuse and reflect more directly from the second texture 42, resulting in a lighter appearance. This exemplary situation is illustrated in FIG. 8, in which a portion of the total area of the transmissive and reflective layer 18 is enlarged to show incident light impinging the upper surface of the transmissive and reflective layer 18 at the third relative angle. Light is more diffuse and reflected more chaotically from the first texture 38 resulting in a darker appearance as shown in detail in FIG. 9, while light is less diffuse and reflected more directly from the second texture 42, resulting in a lighter appearance. At another relative angle or range of relative angles, light may be less diffuse and reflect more directly from the first texture 38, resulting in a darker appearance, while light may be more diffuse and reflect more chaotically from the second texture 42, resulting in a lighter appearance.

Furthermore, the transmissive and reflective layer 18 may reflect some wavelengths of light in the visible spectrum, while other wavelengths of light in the visible spectrum are transmitted through, or pass through, the transmissive and reflective layer 18. This property makes the display assembly 10, as seen from above, appear to have a certain color, hue, or tint. As an example, one or more blue wavelengths of light received from above the transmissive and reflective layer 18 may be reflected, while other wavelengths, perhaps all remaining visible spectrum wavelengths, of light received from above the transmissive and reflective layer 18 may be transmitted from, or passed through, the transmissive and reflective layer 18. This may make the display assembly 10 appear to be a shade of blue. The light that is transmitted from, or passed through, the transmissive and reflective layer 18 may be absorbed by, or reflected by, one or more layers or components beneath the transmissive and reflective layer 18. The transmissive and reflective layer 18 may form, or constitute, a wavelength spectrum filter layer. The transmissive and reflective layer 18 may be formed from materials with both transmissive and reflective properties, such as powders or dust that include one or more metals and/or metallic alloys. The content or composition of the materials, such as the type and/or amount of one or more metals and/or metallic alloys, may determine the wavelength or wavelengths of light that are reflected by the transmissive and reflective layer 18.

The clear film layer 20 is generally transmissive, or transparent, to light received from sources both above and below the clear film layer 20. In addition, the clear film layer 20 may provide a rigid or firm barrier or structural support between the texture layer 16 and the cover layer 22. In exemplary embodiments, the clear film layer 20 is formed from polymers, such as polyethylene terephthalate (PET) plastic substrate. In various embodiments, the clear film layer 20 may be omitted from the display assembly 10 if the texture layer 16 is formed from rigid or firm materials.

The cover layer 22 is generally transmissive, or transparent, to light received from sources both above and below the cover layer 22. In addition, the cover layer 22 may provide an upper, protective surface for the display assembly 10. In exemplary embodiments, the cover layer 22 is formed from glass or similar materials.

Each optically clear adhesive layer 24, 26 generally adheres or bonds two adjacent layers of the display assembly 10 to one another. The optically clear adhesive layers 24, 26 may be formed from adhesives including resins and/or polymers, etc. The first optically clear adhesive layer 24 bonds the display 14 to the transmissive and reflective layer 18, and the second optically clear adhesive layer 26 bonds the clear film layer 20 or the texture layer 16 to the cover layer 22.

The mask and cushion components 28 may provide structural support, cushioning, and/or suspension between the display 14 and the transmissive and reflective layer 18. A first mask and cushion component 28 is positioned adjacent to a first edge of the display assembly 10 between the display 14 and the transmissive and reflective layer 18 and a second mask and cushion component 28 is positioned adjacent to a second edge of the display assembly 10 between the display 14 and the transmissive and reflective layer 18.

In an exemplary embodiment as shown in FIG. 1, the display 14 is displaying the time of day, day of week, and date—all of which are visible through the other layers of the display assembly 10. The display 14 may also display other information either simultaneously or sequentially, wherein the information includes number of steps taken, heart rate, activity time, calories burned, text messages, emails, phone call notices, and the like. In various embodiments, the display 14 may automatically shut off, or may optionally be turned off such that the display 14 displays no information or images and does not transmit light, as shown in FIGS. 2, 6, and 7. In both operational modes of the display 14 (on and off), the transmissive and reflective layer 18 reflects of the light from external sources that impinges its upper surface, as described above. This behavior of the transmissive and reflective layer 18 gives the display assembly 10 visual properties or characteristics that vary according to, or depend on, a relative angle, or range of relative angles, between the external light sources and the display assembly 10. The visual properties or characteristics that vary or change when the external light sources move or when the electronic device 12, and in turn the display assembly 10, move, rotate, or change orientation. For example, at a first relative angle, or range of relative angles, as shown in FIG. 6, the first texture 38 appears in high contrast lighter than the second texture 42 creating a first pattern on the display assembly 10. At a second relative angle, or range of relative angles, as shown in FIG. 7, the first texture 38 appears in high contrast darker than the second texture 42 creating a second pattern on the display assembly 10, which is the inverse, or negative, of the first pattern. At a third relative angle, or range of relative angles, which is in between the first relative angle and the second relative angle, as shown in FIGS. 1, 2, and 8, the first texture 38 appears darker than the second texture 42, but at a much lower contrast than the appearance of the first texture 38 and the second texture 42 in FIG. 7—thus presenting a third pattern, different from the first pattern and the second pattern. Furthermore, as the relative angle changes, so does the contrast between the first texture 38 and the second texture 42 which presents additional patterns on the display assembly 10.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. A wrist-worn electronic device that includes a display assembly comprising:
    a display including an upper surface on which visual data is displayed and from which light is emitted;
    a texture layer positioned above the display, the texture layer configured to be transparent to light received from sources above and below the texture layer, the texture layer including a lower surface having a first texture and a second texture, the first texture including structural components and the second texture including structural components that are different from structural components of the first texture;
    a transmissive and reflective layer including an upper surface in contact with the lower surface of the texture layer, the transmissive and reflective layer configured to be transparent to light from the display and to reflect at least a portion of light from external sources, the transmissive and reflective layer including a first texture and a second texture each positioned on the upper surface, the first texture of the transmissive and reflective layer including structural components that are complementary to the structural components of the first texture of the texture layer and the second texture of the transmissive and reflective layer including structural components that are complementary to the structural components of the second texture of the texture layer; and
    a cover layer positioned above the texture layer, the cover layer forming an upper surface of the display assembly and configured to be transparent to light received from sources above and below the cover layer.

2. The wrist-worn electronic device of claim 1, wherein the first texture of the texture layer occupies a first region of the lower surface of the texture layer and the second texture of the texture layer occupies a second region of the lower surface of the texture layer; and the first texture of the transmissive and reflective layer occupies a first region of the upper surface of the transmissive and reflective layer and the second texture of the transmissive and reflective layer occupies a second region of the upper surface of the transmissive and reflective layer such that the first region of the transmissive and reflective layer aligns with the first region of the texture layer and the second region of the transmissive and reflective layer aligns with the second region of the texture layer.

3. The wrist-worn electronic device of claim 2, wherein the first region of the transmissive and reflective layer occupies a first portion of the lower surface and the second region of the transmissive and reflective layer occupies the remaining portion of the lower surface.

4. The wrist-worn electronic device of claim 1, wherein the display is bonded to the transmissive and reflective layer with an optically clear adhesive.

5. The wrist-worn electronic device of claim 1, wherein the cover layer is bonded to the texture layer with an optically clear adhesive.

6. The wrist-worn electronic device of claim 1, wherein the display assembly further comprises a clear film layer configured to provide structural support between the texture layer and the cover layer, and the cover layer is bonded to the clear film layer with an optically clear adhesive.

7. The wrist-worn electronic device of claim 1, wherein a visual contrast between the first texture of the transmissive and reflective layer and the second texture of the transmissive and reflective layer varies according to a relative angle between the transmissive and reflective layer and a source of the light that is incident on the transmissive and reflective layer.

8. The wrist-worn electronic device of claim 1, wherein the transmissive and reflective layer is formed from a powder that includes one or more metals and/or metallic alloys which is applied to the lower surface of the texture layer.

9. The wrist-worn electronic device of claim 1, wherein the transmissive and reflective layer is configured to reflect a selected wavelength or range of wavelengths of visible light.

10. A wrist-worn electronic device that includes a display assembly comprising:
a display including an upper surface on which visual data is displayed and from which light is emitted;
a texture layer positioned above the display, the texture layer configured to be transparent to light received from sources above and below the texture layer, the texture layer including a lower surface having a first texture and a second texture, the first texture including structural components and the second texture including structural components that are different from structural components of the first texture; and
a transmissive and reflective layer including an upper surface in contact with the lower surface of the texture layer, the transmissive and reflective layer configured to be transparent to light from the display and to reflect at least a portion of light from external sources, the transmissive and reflective layer including a first texture and a second texture each positioned on the upper surface, the first texture of the transmissive and reflective layer including structural components that are complementary to the structural components of the first texture of the texture layer and the second texture of the transmissive and reflective layer including structural components that are complementary to the structural components of the second texture of the texture layer, wherein a visual contrast between the first texture of the transmissive and reflective layer and the second texture of the transmissive and reflective layer varies according to a relative angle between the transmissive and reflective layer and a source of the light that is incident on the transmissive and reflective layer.

11. The wrist-worn electronic device of claim 10, wherein the display assembly further comprises a cover layer positioned above the texture layer, the cover layer forming an upper surface of the display assembly and configured to be transparent to light received from sources above and below the cover layer.

12. The wrist-worn electronic device of claim 11, wherein the display is bonded to the transmissive and reflective layer with an optically clear adhesive and the cover layer is bonded to the texture layer with an optically clear adhesive.

13. The wrist-worn electronic device of claim 12, wherein the display assembly further comprises a clear film layer configured to provide structural support between the texture layer and the cover layer, and the cover layer is bonded to the clear film layer with an optically clear adhesive.

14. The wrist-worn electronic device of claim 10, wherein
the first texture of the texture layer occupies a first region of the lower surface of the texture layer and the second texture of the texture layer occupies a second region of the lower surface of the texture layer; and
the first texture of the transmissive and reflective layer occupies a first region of the upper surface of the transmissive and reflective layer and the second texture of the transmissive and reflective layer occupies a second region of the upper surface of the transmissive and reflective layer such that the first region of the transmissive and reflective layer aligns with the first region of the texture layer and the second region of the transmissive and reflective layer aligns with the second region of the texture layer.

15. A wrist-worn electronic device that includes a display assembly comprising:
a display including an upper surface on which visual data is displayed and from which light is emitted;
a texture layer positioned above the display, the texture layer configured to be transparent to light received from sources above and below the texture layer, the texture layer including a lower surface having a first texture and a second texture, the first texture including structural components and the second texture including structural components that are different from structural components of the first texture;
a transmissive and reflective layer including an upper surface in contact with the lower surface of the texture layer and a lower surface bonded to the display with an optically clear adhesive, the transmissive and reflective layer configured to be transparent to light from the display and to reflect at least a portion of light from external sources, the transmissive and reflective layer including a first texture and a second texture each positioned on the upper surface, the first texture of the transmissive and reflective layer including structural components that are complementary to the structural components of the first texture of the texture layer and the second texture of the transmissive and reflective layer including structural components that are complementary to the structural components of the second texture of the texture layer; and
a cover layer bonded to the texture layer with an optically clear adhesive, the cover layer forming an upper surface of the display assembly and configured to be transparent to light received from sources above and below the cover layer.

16. The wrist-worn electronic device of claim 15, wherein
the first texture of the texture layer occupies a first region of the lower surface of the texture layer and the second texture of the texture layer occupies a second region of the lower surface of the texture layer; and
the first texture of the transmissive and reflective layer occupies a first region of the upper surface of the transmissive and reflective layer and the second texture of the transmissive and reflective layer occupies a second region of the upper surface of the transmissive and reflective layer such that the first region of the transmissive and reflective layer aligns with the first region of the texture layer and the second region of the transmissive and reflective layer aligns with the second region of the texture layer.

17. The wrist-worn electronic device of claim 16, wherein the first region of the transmissive and reflective layer occupies a first portion of the lower surface and the second region of the transmissive and reflective layer occupies the remaining portion of the lower surface.

18. The wrist-worn electronic device of claim 15, wherein a visual contrast between the first texture of the transmissive and reflective layer and the second texture of the transmissive and reflective layer varies according to a relative angle between the transmissive and reflective layer and a source of the light that is incident on the transmissive and reflective layer.

19. The wrist-worn electronic device of claim 15, wherein the transmissive and reflective layer is formed from a powder that includes one or more metals and/or metallic alloys which is applied to the lower surface of the texture layer.

20. The wrist-worn electronic device of claim 15, wherein the transmissive and reflective layer is configured to reflect a selected wavelength or range of wavelengths of visible light.

* * * * *